Patented Aug. 10, 1943

2,326,585

UNITED STATES PATENT OFFICE 2,326,585

HIGH PRESSURE ALKYLATION REACTION

Hans G. Vesterdal, Elizabeth, N. J., assignor to Standard Oil Development Company, a corporation of Delaware No Drawing. Application October 5, 1940, Serial No. 359,895

10 Claims. (Cl. 260—683.4)

The present invention relates to the alkylation and/or polymerization reactions in which isoparaffins are condensed with olefins and/or olefins are condensed with either similar or dissimilar olefin molecules to yield normally liquid, branched chain, saturated and/or unsaturated hydrocarbons which find uses as blending agents and have direct application to utilization in the production of motor fuels.

It is known to condense isoparaffins with olefins and to condense olefins with similar or dissimilar olefin molecules to produce alkylation reaction products and/or polymerization products. This has been done thermally, that is, by the application of heat alone, and it has also been accomplished by resorting to the use of certain catalysts under quite varying reaction conditions. Among the catalysts employed for effecting condensation of olefins, either with themselves or with isoparaffins, may be mentioned concentrated sulfuric acid, aluminum chloride with or without the use of hydrogen halide, and various other Friedel-Crafts type catalysts, boron fluoride-water mixtures and their resulting chemical compounds, phosphoric acid either alone or deposited on carriers such as kieselguhr and the like, and various other similar compounds.

The process of the present invention is primarily concerned with the production of normally liquid, branched chain, substantially completely saturated hydrocarbons boiling within the motor fuel boiling range, but is of necessity concerned with the production of polymers of olefins since the reaction taking place according to the process of the present invention is not one of alkylation to the exclusion of one of polymerization. In other words, while it is possible to produce substantial quantities of polymers in the reaction mixture, nevertheless it is an object of the present invention to so manipulate the reaction conditions, catalyst, reactants, etc., to obtain as high yields as possible of the desired alkylates. The product as prepared according to the present invention therefore predominates in saturated, branched chain, normally liquid hydrocarbons.

The process of the present invention may be in general described as effecting a condensation between at least one isoparaffin and at least one olefin, preferably a monoolefin, and/or a condensation between an olefin, preferably a monoolefin, and another olefin either of similar or dissimilar configuration, these two types of reaction being carried out simultaneously under reaction conditions conducive to the production of normally liquid hydrocarbon condensation products, the said reactions being catalyzed by the presence of one or more substances taken from the group consisting of oxides and sulfides of metals of groups 5, 6 and 7 of the periodic system. In carrying out this process it is necessary, however, in order to secure the desired results to have present in the reaction zone during the reaction small amounts of a substance having the formula $H_2X$, wherein X is either oxygen or sulfur. In other words, the reaction is carried out in the presence of water or hydrogen sulfide. However, it may also be carried out in the presence of a mixture of these two substances. Fundamentally, the reaction is a vapor phase process. However, under certain restricted specific reaction conditions where a proper choice of reactants has been made it may be possible and at times desirable to carry out the reaction in the liquid phase. Ordinarily, however, vapor phase reaction is preferred.

The various catalysts which are contemplated may be further defined as including the oxides and sulfides of manganese, chromium, molybdenum, tungsten, uranium and vanadium, columbium and tantalum. It is unnecessary, and in fact at times undesirable, to employ any one of these specific compounds as the catalyst. It is oftentimes desirable to employ a mixture of two or more of these catalysts. For example, chromium and molybdenum oxides may be employed, vanadium and chromium oxides, vanadium and molybdenum oxides, or a three-component catalyst such as, for example, vanadium, chromium and molybdenum oxides. It is within the scope of the present invention to employ mixed catalyst of oxides and sulfides, for example, chromium oxide admixed with molybdenum sulfide. However, in promoting this reaction with either water, hydrogen sulfide, or mixtures of water and hydrogen sulfide, it is well to keep in mind that under the usual reaction conditions if sufficient amounts of hydrogen sulfide are present as the promoter eventually the oxide catalyst will be converted into the corresponding sulfide compounds. In the preferred embodiment of the invention the oxide catalysts are preferred, not only because of their increased activity with respect to alkylation but also because of their greater ease of regeneration. The regeneration process will be described hereinafter. Furthermore, there is one other advantage to the use of the oxide catalysts, particularly when used in connection with water as the promoter, and that is with respect to the recovery of the desired final products. In cases where sulfides and hydrogen sulfide are employed in the reaction, it is oftentimes necessary to resort to an alkali wash in order to remove from the final product dissolved sulfur compounds, whereas in connection with the use of oxide catalyst with a water promoter it is unnecessary to subject the final desired product to such purification treatment.

Although the above described catalysts may be employed alone in the process of the invention, it is desirable particularly in commercial operations and from the economical standpoint to employ the catalyst in conjunction with a carrier. The types of carrier employed may be quite varied in nature and although no determination has been made it is felt that in some instances the carriers are not inert in the reaction and in some manner contribute to the ultimate final yield of the desired products. Carriers may be either of the porous or non-porous type, although since the reaction embodying the invention is thought to be essentially a surface reaction it is preferred to employ the porous carriers. These carriers are of the type such as clays, either natural or acid activated, the gels such as, for example, alumina gel or silica gel, bauxite, fuller's earth, bentonite, kieselguhr, pumice, celite, montmorillonite, marsil, tonsil, Super Filtrol, activated floridin, activated charcoal or activated carbon; and various other types of carriers such as pieces of porcelain or chemical stoneware and the like may be employed.

Various methods may be employed in depositing the heretofore mentioned oxides and sulfides on the carriers. In general, the oxides are deposited upon the porous carriers by the impregnation of said carriers, for example, silica gel or alumina gel, by admixing with the corresponding hydro gels salts of the various metals which upon thermal treatment decompose to give the desired oxides. The sulfides of the above-mentioned metals may be incorporated in the porous carriers by precipitating the aforementioned metal salts on the hydro gels and heating in the same manner as the oxides are produced. This catalyst mass may be then treated with hydrogen sulfide, ammonium sulfide, or some equivalent sulfide compound in order to convert the metal oxides to their corresponding sulfides. Mixtures of two or more of the porous carriers may be employed as, for example, a mixed alumina-silica gel or an activated carbon admixed with an alumina or silica gel. In connection with the deposition of the metal oxides or sulfides on the non-porous type carriers, it is sometimes advantageous to employ a binder. Generally, however, a wetting of the non-porous carrier followed by drying or thermal treating to convert to the oxide is sufficient to leave a coating on the carrier which is adequate for use in the reaction. The amount of oxides and/or sulfides of the metals of the fifth, sixth or seventh groups of the periodic system deposited may vary considerably with respect to the carriers employed. In general, however, the ultimate percentage of oxide and/or sulfide of the metals impregnated in or deposited on these carriers varies between about 1% and about 10% or even as high as 30%, preferably between 7% and 20% by weight of the amount of carrier employed. Runs have been made employing catalysts wherein the metal oxides or sulfides constitute as high as ⅓ of the total weight of the catalyst. The optimum percentages of metal oxides or sulfides deposited on the various carriers depends to some extent upon the available surface area of the carrier employed.

Also, depending upon the reaction conditions, the amount of catalytic component of the catalyst mass may vary considerably. Thus, when carrying out the reaction under drastic reaction conditions a lesser amount of the catalytic component of the catalyst mass is ordinarily required than is the case where the reaction is carried out under milder reaction conditions, in which case a larger portion of the catalyst mass is preferably the active catalytic component.

The catalyst may be prepared in any desired form such as, for example, pills, pellets, briquettes or powder, or some other finely divided or comminuted form. It is likewise possible and at times preferred to extrude the catalyst composition, particularly where the gels are employed, in the form of the hydro gels through orifices of predetermined size. The extruded catalyst is then heated to drive off the water and to decompose the metal salts to the corresponding metal oxides or sulfides.

The specific oxides and sulfides employed in the process of the invention may vary in form depending upon the degree of oxidation of the particular metal. In general, it is proposed to employ those oxides and sulfides of metals which constitute at least theoretically the acid anhydrides of those metals employed. Thus, for example, $Cr_2O_3$ is employed since it is considered to be the acid anhydride of chromous acid. $CrO_3$ is employed since it is considered to be the acid anhydride of chromic acid. Similarly, $MoO_3$ is employed as being the counterpart of molybdic acid. This analogy likewise applies to the sulfides since, for example, $MoS_3$ is considered the acid anhydride of thiomolybdic acid and $Cr_2S_3$ is considered the acid anhydride of thiochromous acid. Various other oxides and sulfides of chromium may be employed. Thus, for example, $CrO_2$, $CrS$ and $Cr_3S_4$ may be employed. In the case of vanadium oxides and sulfides, the compounds customarily employed are $V_2S_5$, $V_2S_3$, $V_2S_2$, $V_2O_5$, $V_2O_4$, $V_2O_3$ and $V_2O_2$. The manganese compounds include $MnS_2$, $MnS$, $Mn_2O_3$, $Mn_2O_7$, $MnO_2$, etc. It should be distinctly understood, however, that although no definite information is to be had at the present time, these various oxides and sulfides when deposited on the carriers and employed in the reaction under the hereinafter specified reaction conditions are very probably altered in their chemical structure by reason of the reaction conditions to the more stable oxides and sulfides.

A catalyst of the type employed may be prepared by co-precipitating the hydroxides of aluminum and chromium wherein the molar ratio of aluminum to chromium is ultimately to be about 2:1 with ammonia from a solution of the aluminum and chromium nitrates. The resultant gel is washed and dried, molded or pressed into the desired shape, for example, pills, and then heated to about 800° F. for a length of time sufficient to substantially completely dehydrate the same. To prepare a molybdenum oxide catalyst, the hydroxide of aluminum was impregnated with an aqueous solution of ammonium molybdate sufficient so that the catalyst will contain about 9% of molybdic oxide in the final product. The resultant mass was washed and heated for about 30 minutes at 1200° F. The powder obtained was then pressed or briquetted into the desired pellet form for use in the reaction. Another catalyst which has found use in the present reaction was prepared by admixing aluminum hydroxide with silica hydro gel and adding thereto a sufficient amount of an aqueous solution of ammonium vanadate and homogenizing the same. The resultant mass was then washed, freed of excess water, pilled and then heated to about 800° F. for about 3 hours. This composition contained about 1.7% of vanadium pentoxide. The weight ratio of silica to alumina was maintained at about 1.7:1.

The reaction may be carried out using a variety of reactants. It is necessary that at least one of the reactants be an isoparaffin, that is, a paraffinic hydrocarbon containing at least one tertiary carbon atom per molecule. Such compounds as isobutane, isopentane and higher homologues are suitable as one of the reactants in the process. Mixtures of two or more of the isoparaffins may likewise be employed, particularly where safety fuels and aviation naphthas and the like are the desired final products. The presence of normal paraffins in admixture with isoparaffins is in no wise detrimental to the activity of the isoparaffins. In fact, there is some indication that a portion at least of the paraffinic constituents of the feed stock may to some extent become dehydrogenated during the reaction to form the corresponding olefinic compounds. Not only are the corresponding olefinic compounds though to be formed but likewise to some extent at least it is thought that the paraffins either of the branched or straight chain type undergoing dehydrogenation may be isomerized to the corresponding straight or branched chain type, as the case might be. Although as such the normal paraffins appear to be substantially inert in the reaction as herein indicated, they may to the extent to which they are isomerized and/or dehydrogenated prove a distinct benefit by their presence in the reaction feed stock.

The olefinic reactants may be selected from a number of the common olefins present in refinery gases and to be found elsewhere as well. For example, ethylene, propylene, normal butylenes, isobutylene, the isomeric pentenes, and similar higher monoolefinic hydrocarbons of either a straight chain or branched chain character, may be employed. Mixtures of two or more of these olefins may be employed as the olefinic components of the feed stock. It is generally preferred to employ normally gaseous olefins as the reactants but this is chiefly because of economic factors. Normally liquid monoolefins, however, are equally desirable. Such olefins are polymers, copolymers, interpolymers, etc., of the above-mentioned monoolefins, these being, for example, diisobutylene, triisobutylene, the polymers resulting from the condensation of normal butylenes with isobutylene, of butadiene with butylenes, and the like.

Suitable sources of the various olefins and isoparaffins are to be found in the gases coming from the thermal and/or catalytic cracking units of an oil refinery, from field butanes which have been subjected to prior isomerization and/or partial dehydrogenation treatments, from refinery stabilizer bottoms, from stabilizer overhead gases, etc. In general, it is preferred to employ a molar excess of the isoparaffinic components of the feed stock with respect to the total olefinic content of that feed stock. A molar ratio of isoparaffins to olefins of at least 2:1 and preferably of at least 5:1 is desirable. Molar ratios running as high as 30:1 are, however, within the scope of the present invention, although it is to be understood that equal molar ratios may be employed without attendant sacrifice in quality of the product in some instances.

The process may be carried out either as a batch, continuous or semi-continuous type of operation. Economic considerations make it preferable to carry the process out in a continuous manner, especially where the process is operated on a commercial scale. The reaction mixture should be intimately contacted with the catalyst since the reaction is apparently a contact type and higher yields of the desired product are obtained by a vigorous and intimate mixing or agitation of the reactants in the presence of and in contact with the catalyst mass under the reaction conditions. In general, however, under the reaction conditions this degree of agitation is attained without the use of any external or mechanical means of agitation being employed. No particular type of apparatus is required to successfully carry out the reaction. Equipment customarily employed for the catalytic dehydrogenation of paraffinic hydrocarbons under superatmospheric pressures or for the high pressure hydrogenation processes which are well known may be employed to advantage in carrying out the present process.

The temperature under which the reaction is maintained may vary considerably. The reaction is carried out under temperatures ranging between about 375° F. and about 950° F., preferably between about 575° F. and about 800° F. It is realized of course that with each particular type of catalyst employed the optimum temperature varies considerably but in general the above temperature ranges are adequate for carrying out the reaction to give the desired motor fuel products.

The process is carried out under fairly high superatmospheric pressures. Pressures ranging between about 500 and about 16,000 pounds per square inch, preferably between about 1500 and about 14,000 pounds per square inch, are employed. The time of contact of the reactants with the catalyst under the temperature and pressure conditions above mentioned may vary considerably depending upon the temperature, pressure and nature of the reactants employed. In general, the time of contact lies between about 1 and about 60 minutes, preferably between about 10 and about 30 minutes. Reasonable care should be exercised in correlating the above-defined reaction conditions together with the type of feed stock employed so as to avoid substantial cracking or carbonization of the hydrocarbons fed to the reaction zone. Obviously, a temperature as high as 950° F. with a pressure of around 500 pounds per square inch and a time of contact of around 60 minutes would quite extensively carbonize and crack a feed stock containing $C_6$ and $C_7$ isoparaffins in conjunction with $C_8$ or $C_{12}$ monoolefins. Likewise, the conditions should be sufficiently drastic to effect a substantial condensation of the olefinic components of the feed stock principally with the isoparaffinic components of that feed stock or at least with another portion of the same or different olefinic components of that feed stock. In other words, an extremely mild condition when employing diisobutylene with $C_6$ and $C_7$ isoparaffins, that is, a contact time of around 1 minute when using a pressure of around 500 pounds per square inch and a temperature of around 375° F. would obviously not be sufficient to produce the desired result. Suffice it to say that the optimum reaction conditions for any particular feed stock to give the desired final products are best determined for any particular catalyst employed by one or two trial runs at varied temperatures, pressures and times of contact within the ranges heretofore outlined and in accordance with the principles of the invention as heretofore stated.

The amount of hydrogen sulfide and/or water added to the reactants or conducted directly into the reaction zone varies to a certain extent depending upon the amount of active catalyst present in the catalyst composition. In general, the amount of promoter added to the reaction or present in the reaction zone at any one time should be between about 0.5% and about 20% by weight of the catalyst mass, preferably between about 5% and about 15% by weight. As will be understood from the hereinafter described runs under the particular reaction conditions therein outlined, about 10% by weight of water was found to be optimum therein. As a general guide in determining the amount of hydrogen sulfide or water to be present in the reactor at any one time, it may be stated that sufficient promoter should be present in contact with the catalyst to at least afford a monomolecular film of the promoter in contact with the active surface of the catalyst mass.

After prolonged usage of the catalyst mass in the present reaction, in some cases after usages amounting to as long as 4,000 hours, the catalytic activity becomes somewhat impaired. The addition of elemental oxygen or elemental sulfur, depending upon whether the catalyst employed is an oxide or a sulfide, will to some extent reactivate the catalyst. The inactivity of the catalyst after prolonged usage has been thought to be due largely to an accumulation or building up and clogging of the pores of the catalyst or covering of the catalyst surface with carbonaceous deposits. The introduction of oxygen or sulfur, particularly where the carbonaceous deposits are of a soft or gummy consistency, will in some cases purge the mass of these deposits, and although not completely reactivating the mass, will substantially revivify the same and fit it for further usage in the reaction. In order to completely reactivate the catalyst once its catalytic activity has become substantially impaired, the catalyst is withdrawn from the reaction and, in the case of the oxide catalysts, the original activity may be restored by the introduction of air or oxygen either diluted with inert gases such as, for example, nitrogen or carbon dioxide or steam, at temperatures of between about 800° F. and about 1300° F. for a sufficient length of time to enable the rapid oxidation of the carbonaceous material to substantially completely remove the same from the pores and from the surface of the catalyst mass. This introduction of free oxygen-containing materials should be controlled so that the regeneration follows a fairly even course and avoids the burning off of the carbonaceous mass at erratic rates since the heat of combustion is difficult to remove where the oxidation process becomes too rapid. After the carbonaceous material has been burned off the catalyst is then ready for reuse in the reaction. This method of regeneration is simply illustrative of any number of conventional accepted methods for regenerating catalysts employed in hydrocarbon reactions and the process of the invention is by no means limited or restricted to the described regenerative method. Any suitable regenerative method may be employed.

The regeneration or reactivation of the sulfide catalysts may require a somewhat different type of treatment. The above-described process for regeneration of the oxide catalysts may be resorted to and the resultant reactivated catalyst mass which finds the metal in combination with oxygen rather than sulfur is then dissolved in ammonium hydro sulfide and treated with hydrogen sulfide to form the ammonium thio metallate. Acidification of this mass with sulfuric acid precipitates the metal sulfide which is then heated in the presence of a reducing gas such as, for example, free hydrogen, at between about 500° F. and about 800° F. to form the more stable and more active metal sulfide catalyst. This material may then be formed into pills and the like or it may be directly reused in the process of the invention.

As illustrative of the method of carrying out the process of the invention, but without unduly restricting the invention to the scope specifically disclosed, the following examples are submitted:

*Example 1*

A high pressure bomb capable of withstanding pressures up to 15,000 pounds per square inch at 1100° F. was charged with about 90 grams of a catalyst which was a molybdenum oxide impregnated alumina gel in which the amount of molybdenum oxide was about 9%. To this catalyst there was added sufficient water to constitute about 11% by weight of the catalyst. To this mixture contained in the bomb which was maintained at a temperature of about 720° F. there was charged about 432 grams of isobutane and over a period of about 16 minutes there was gradually added about 102 grams of propylene. The bomb was shaken and the heating was continued for an additional 30 minutes. The final temperature of the bomb was about 735° F. and the final pressure was about 11,000 pounds per square inch, the pressure at the end of the propylene addition having been about 14,000 pounds per square inch. The reacted mixture was removed from the bomb and the normally liquid product constituting the $C_5+$ fraction was isolated and constituted a yield of about 160% based on the total propylene reacted and a yield of about 105% based on the total propylene charged to the reactor. This product amounted to about 107.5 grams and the product corresponding to the $C_6$—$C_8$ fraction amounted to about 54% of the total normally liquid product and had a bromine number of about 39. The residue amounting to about 46% of the product recovered had a bromine number of about 30. An increase in the $C_5$—$C_8$ component of the product could be obtained in this run if the olefin had been added more slowly and a higher molar ratio of isobutane to propylene had been maintained in the reaction zone. The isobutane to propylene molar ratio actually amounted to about 3:1 as the run was carried out.

Under comparable conditions, except that no water was added to the catalyst mass prior to the reaction, the yield of normally liquid product amounted to about 50% based upon the olefin charged, or about 89% based upon the olefin consumed. The $C_5$—$C_8$ fraction in this particular run was about 44% of the normally liquid product recovered and it had a bromine number of about 69.

Under comparable conditions, except that no catalyst was employed and no water was added, the product obtained amounted to about 43% of the olefin charged or about 86% of the olefin reacted, and the C₅—C₈ cut constituted 42.5% of the product and had a bromine number of about 17. In view of the fact that the run made without the catalyst and without the addition of water gave a C₅—C₈ cut having a bromine number of 17, in contrast to a bromine number for the of about 39 when employing water and the same cut of about 39 when employing water and the catalyst, it would appear that to some extent at least a dehydrogenation reaction had occurred when the catalyst and water were employed in the reaction. Likewise, where the water was absent but a catalyst was employed, the bromine number of the C₅—C₈ cut was higher than when the water was employed. In that case the bromine number was 69, whereas in the case where water was employed the bromine number was about 39.

The use of only 5% water under comparable conditions gave substantially the same yield of normally liquid product as when water was absent. However, the C₅—C₈ cut in the normally liquid product was 53.8%, and the bromine number was about 61. When using about 20% of water, the other reaction conditions being comparable to those specified in Example 1, the yield of normally liquid product constituted about 48% of the propylene charged to the bomb or about 141% based upon the propylene consumed and the C₅—C₈ fraction amounted to about 55.5% of the normally liquid product and this fraction had a bromine number of about 49.

Example 2

A bomb of the same type as specified in Example 1 was charged with the same catalyst employed in Example 1 in substantially the same amount. To this catalyst there was added about 11% by weight of water. The catalyst composition together with the promoter was then heated to a temperature of about 770° F. and about 386 grams of isobutane were charged to the reactor under a pressure of about 7,000 pounds per square inch. About 101 grams of propylene were slowly added over a period of 16 minutes to the catalyst and isobutane mixture and the pressure rose from about 7,000 pounds per square inch to about 12,400 pounds per square inch and the temperature remained substantially the same. The bomb was shaken and the heating was continued for an additional 30 minutes, at the end of which time the pressure had dropped to about 9,000 pounds per square inch with the temperature being maintained at around 770° F. The normally liquid product amounted to about 87.4 grams and this amounted to a yield of about 87% based on the propylene charged or about 135% based on the propylene consumed. The C₅—C₈ fraction amounted to about 57.5% of this product and it had a bromine number of about 34. The residue likewise had a bromine number of about 34.

Example 3

A bomb similar to that employed in Examples 1 and 2 was charged with about the same amount of a catalyst prepared by co-precipitating aluminum hydroxide and chromium hydroxide with ammonia from a solution of aluminum and chromium nitrates. The co-precipitated gel was washed, dried, pilled and heated to about 800° F. and the relative amounts of the chromium and aluminum compounds employed were such as to yield a resultant chromium oxide:aluminum oxide ratio of about 1:2. To this catalyst there was added about 11% by weight of water. The catalyst was introduced into the bomb which was maintained at a temperature of about 760° F. and to this catalyst mass there was added about 393 grams of isobutane. While maintaining the pressure at about 7,400 pounds per square inch there was added about 116 grams of propylene gradually over a period of about 18 minutes, during which time the pressure rose to about 12,800 pounds per square inch. The bomb was shaken and the heating continued for an additional 30 minutes. The final temperature of the bomb was about 770° F. and the final pressure was about 9,000 pounds per square inch. The normally liquid product recovered from the reaction mixture amounted to about 118 grams which constituted a yield of about 101.5% based on the propylene charged or a yield of about 144% based on the propylene consumed. The C₅—C₈ cut obtained from this product amounted to about 57.3% and had a bromine number of about 25. The residue had a bromine number of about 29.

Under comparable conditions, except that the temperature was maintained at around 700° F. but no water as a promoter was employed in conjunction with the catalyst, the normally liquid product obtained amounted to about 36% based upon the propylene charged or about 92% based on the propylene consumed. The C₅—C₈ fraction which amounted to about 41.2% of the recovered product had a bromine number of about 51.

Example 4

To a bomb maintained at a temperature of about 700° F. there was added the same amount of catalyst as was employed in the preceding examples. This catalyst was prepared by homogenizing a silica hydro gel with aluminum oxide and adding thereto sufficient ammonium vanadate so that upon subsequent treatment the catalyst mass would contain about 1.69% by weight of $V_2O_4$. The homogenized mixture was dried, pilled and then heated to about 800° F. for about 3 hours. The weight ratio of silica to alumina was about 1.7 to 1. To this catalyst there was added about 11% by weight of water and admixed with this catalyst mass was 365 grams of isobutane. To this reaction mixture there was slowly added over a period of about 19 minutes, while maintaining the reaction mass at a temperature of between about 700° F. and about 720° F., about 115.8 grams of propylene. The pressure rose from an initial pressure of about 7,000 pounds per square inch to around 14,000 pounds per square inch. The bomb was shaken and the reaction mixture was maintained under these reaction conditions for an additional 30 minutes, at the end of which time the temperature was around 720° F. and the pressure was about 13,000 pounds per square inch. A normally liquid product was recovered in an amount of about 100.7 grams which amounted to about 87.2% of the propylene charged or about 115.4% of the propylene reacted. Of this product about 55.8% constituted the C₅—C₈ fraction. It had a bromine number of 54, while the residue had a bromine number of about 19.

The nature and objects of the invention having been thus fully described and illustrated, what is claimed as new and useful and desired to be secured by Letters Patent is:

1. A process of reacting isoparaffins with olefins to produce saturated, normally liquid, branched chain hydrocarbons which comprises carrying out said reaction at temperatures between about 375° F. and about 950° F. under superatmospheric pressures in contact with a catalyst whose essential components are selected from the group consisting of oxides and sulfides of metals of group 6 of the periodic system, and in the presence of a small amount of at least one compound having the formula $H_2X$, wherein $X$ is a member of the group consisting of oxygen and sulfur.

2. A process as in claim 1 wherein the time of contact of the reactants with the catalyst under the reaction conditions is correlated to avoid substantial carbonization and cracking.

3. A process which comprises reacting an isoparaffin with a monoolefin at a temperature between about 375° F. and about 950° F. under superatmospheric pressures between about 500 and about 16,000 pounds per square inch for between about ½ and about 60 minutes while correlating the reaction conditions to avoid substantial cracking and carbonization, in contact with a catalyst mass whose essential components are taken from the group consisting of oxides and sulfides of a metal of group 6 of the periodic system, and in the presence of between about ½% and about 20% of the catalyst weight of a compound $H_2X$, wherein $X$ is a member of the group consisting of oxygen and sulfur.

4. A process as in claim 3 wherein the isoparaffin is present in molar excess over the olefin and the catalyst is molybdenum oxide on alumina.

5. A process as in claim 3 wherein the isoparaffin is present in molar excess over the olefin and the catalyst is a chromium oxide on alumina.

6. A process as in claim 3 wherein the $H_2X$ compound is added to the feed and the process is carried out continuously.

7. A process which comprises condensing isobutane with at least one normally gaseous olefin at a temperature between about 550° F. and about 900° F. under a superatmospheric pressure between about 1000 and about 14,000 pounds per square inch for between about 10 and about 30 minutes in contact with a catalyst mass whose essential components are selected from the group consisting of oxides and sulfides of metals of group 6 of the periodic system and in contact with between about 5% and about 15% by weight of the catalyst mass of a member of the group consisting of hydrogen sulfide and water, correlating the reaction conditions to avoid substantial cracking and carbonization and recovering normally liquid product.

8. A process which comprises condensing a refinery $C_4$ cut containing isobutane, iso and normal butylenes and normal butane in which the isobutane is present in a substantial molar excess over the total $C_4$ olefins present therein, at a temperature between about 550° F. and about 900° F. and under a pressure of between about 1000 and about 14,000 pounds per square inch for a period between about 10 and about 30 minutes in contact with a catalyst mass whose essential component is an oxide of a metal of group 6 of the periodic system, which contains added thereto about 11% by weight of water, and recovering substantially saturated, branched chain, normally liquid hydrocarbons from the reacted mixture.

9. An improved process for alkylating olefinic hydrocarbons with an isoparaffin, comprising subjecting the olefin and isoparaffin to the action of a catalyst, comprising essentially only a 6th group metal oxide, under reaction temperature and superatmospheric pressure while in the presence of a small amount of a compound having the formula $H_2X$, wherein $X$ is a member of the group consisting of oxygen and sulfur.

10. An improved process for alkylating olefinic hydrocarbons with an isoparaffin, comprising subjecting the olefin and isoparaffin to the action of a catalyst, comprising essentially only a 6th group metal sulphide, under reaction temperature and superatmospheric pressure while in the presence of a small amount of a compound having the formula $H_2X$, wherein $X$ is a member of the group consisting of oxygen and sulfur.

HANS G. VESTERDAL.